Feb. 25, 1969     E. RICKETT     3,428,997

RESILIENT WINDSHIELD WIPER BLADE

Filed Aug. 28, 1967

INVENTOR.
EDWARD RICKETT

BY Richard D. Law

ATTORNEY

United States Patent Office 3,428,997
Patented Feb. 25, 1969

3,428,997
RESILIENT WINDSHIELD WIPER BLADE
Edward Rickett, Littleton, Colo., assignor to Daco, Inc., Littleton, Colo., a corporation of Colorado
Filed Aug. 28, 1967, Ser. No. 663,795
U.S. Cl. 15—250.36           6 Claims
Int. Cl. B60s 1/32, 1/28; A47l 1/02

ABSTRACT OF THE DISCLOSURE

A flexible, resilient windshield wiper blade having two major body portions connected by a narrow flange, with each body portion having at least one passage extending through the length thereof and, also, one body terminates a bifurcated edge to provide a squeegie action for a clean wipe by the blade along its length, particularly for curved windshields. Opposite the bifurcated edge, the blade is provided with a lateral holding flange extending the length of the blade for holding the blade support members to the windshield wiper assembly.

---

Most modern automobiles, and particularly American made automobiles are provided with curved, slanting windshields. The slanting windshields particularly are subject to fall out of dirt and grease from the high concentration of oil-laden exhaust fumes, road dirt churned up by the vehicles, and the like. The dirty films that form on the windshields prevents thorough wetting of the glass by precipitation, and the result is that the wiping of the glass by a windshield wiper does not completely clear the surface, and actually may smear the glass. It is, of course, necessary that the windshield be wiped clean to provide good visibility for the driver.

A windshield wiper assembly includes an oscillating wiper arm and some type of a support which holds the flexible, resilient portion of the wiper blade onto the windshield. Due to the curved and slanting windshields the support must provide spring bias on the blade along its length so that the wiping edge follows the contour of the windshield as it passes across the surface. It is, furthermore, highly important that the spring pressure on the blade be uniform along its length, for otherwise the wiping leaves streaks or smears particularly in the areas of lesser spring pressure. Therefore, the flexible, resilient element of the assembly must provide longitudinal flexibility with a certain amount of lateral stability to prevent the resilient member from merely flopping over and riding on its side. The condition of the surface of the windshield is never uniform; particularly when the wipers are being used there may be dry spots and wet spots and this produces areas where the blade may hang while the rest of the blade moves smoothly across the glass surface. The result is an erratic action which produces jerking and sometimes jumping of the blade across the glass surfaces. It has been found that a wiper blade, wipes best when it is drug at an angle across the glass with the contact edge of the blade trailing the body of the blade. This gives with a spring support better action of the resilient member on the glass, by increasing the spring action on the edge due to the bent position of the flexible member itself.

The usual windshield wiper blade is made of natural rubber, and is molded, generally with some non-continuous extrusions secured to the sides of the blade for various purposes. The rubber, of course, is adversely affected by ozone in the air, deteriorated by oil and gasoline, and by heat and light on long term exposure. The usual rubber windshield wiper deteriorates and cracks within a relatively short period of time and the blade will not wipe cleanly under such conditions and may even tear apart under usage.

Among the objects and advantages of the present invention is to provide a windshield wiper with two wiping edges which will wipe cleanly under various conditions of the surface of the glass which it is wiping.

Another object of the invention is to provide a flexible, resilient windshield wiper blade which has both longitudinal flexibility and stability and is arranged to provide an additional spring pressure in use under wiping conditions.

Another object of the invention is to provide a windshield wiper, flexible, resilient blade which is constructed to enhance the spring action of its carrier yoke in the wiping action of the blade on a windshield.

These and other objects and advantages of the invention may be readily ascertained by referring to the following description and the accompanying drawings, wherein.

Figure 1:
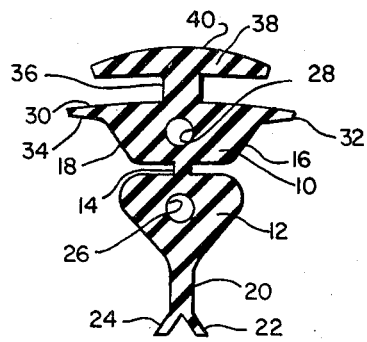
FIG. 1 is a cross-sectional view of a flexible, resilient windshield wiper blade according to the invention.

In general, the windshield wiper blade of the invention is comprised of two major body sections, one being generally rectangular in cross-section and the other being generally pear-shaped in cross-section and the two joined together by a narrow flange extending along the length of the two bodies. Extending normally from the rectangular shaped body portion, on the side opposite the pear-shaped body, is a T-shaped flange which secures the blade to a support yoke. On the opposite side extending from the pear-shaped body portion it is a bifurcated wiping edge which is the portion that comes into contact with the glass and actually wipes the glass. To provide a spring action for the blade, a pair of laterally directed flanges are secured to the rectangular portion adjacent the T-shaped flange for impinging upon the support of the blade.

In the device selected illustration, a flexible, resilient blade, preferably made of extruded neoprene, includes a first major body portion 10, which is of a general rectangular shape in cross-section secured to a second major body portion 12 (of a general pear-shape) by means of a flange or neck 14 secured therebetween. The first body 10 includes outwardly diverging sides 16 and 18 which terminate in outwardly directed flanges 32 and 34 which extend as a continuation of the top wall 30 of the body 10. The top wall 30 is slightly arcuate, however, the general appearance of the first body portion 10 is trapezoidal. The second body portion 12 is pear-shaped, terminating at its point in an outwardly directed flange 20 which in turn terminates in a bifurcated end having edges 22 and 24. Both of the body portions have a passage extending completely longitudinally therethrough. The pear-shaped portion 12 has a passage 26 and the trapezoidal portion 10 has a passage 28 extending longitudinally therethrough. Integrally attached to the body 10, on the side opposite the flange 14 is another outwardly extending flange 36 which is slightly wider than the flange 14. A lateral member 38 is integrally attached to the flange 36 forming therewith a T-shaped holder for fitting in a support member of a windshield wiper assembly. The top of this T-shaped member is arcuate.

Figure 2:
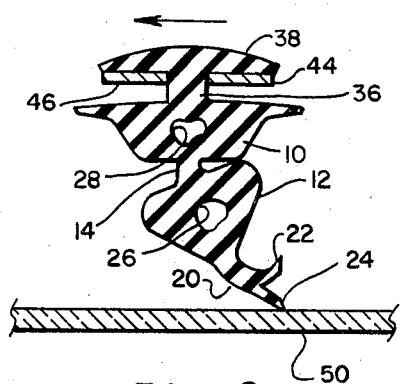
FIG. 2 is a cross-sectional view of a windshield wiper blade showing one type of holder and its action on a glass surface in one direction.

The passages through the major body portions of the windshield wiper blade adds a substantial amount of longitudinal flexibility so that the blade will bend or arc longitudinally along a curved windshield and provide means for applying a uniform pressure along the length of the blade. The neoprene material in each body around the holes provides lateral stability of the blade and prevents it from crimping or crinkling under the pressure of the blade holder necessary to make the blade curve. Furthermore, the passages will distort under bending movement as the blade is moved across a surface to provide an additional flexibility in a lateral sense. The material around the hole being distorted and under tension when the blade is bent, aids in returning the blade to normal configuration when side pressure is released. As shown in FIG. 2, the blade is mounted in a support which includes a pair of steel ribbon supports 44 and 46 mounted on each side of the flange 36 and the T-shaped top 38 supports the blade in the holder. Such supports are commonly used and their attachment to a blade and to a wiper assembly is conventional and further explanation is not deemed necessary. As the blade moves across a glass surface 50, in the direction of the arrow toward the left of the page, the blade is bent due to the friction between the edge and the glass, so that the bodies 12 and 10 are somewhat distorted, and the flange 14 is diffentially distorted being stretched on one side and compressed on the other. This distortion contacts the material in the two bodies and deforms the passages, shown somewhat exaggerated. The stretched material aids in the return of the blade to upright position when the movement has ceased and helps prevent a permanent set taking in the material. It is noted that the only one bifurcated edge 24 is in wiping contact with the glass 50 in each wiping movement. The bifurcated edge 24 provides a sharp edge for wiping the glass and on the return trip the edge 22 wipes the glass when the blade is moved in the opposite direction.

Figure 3:
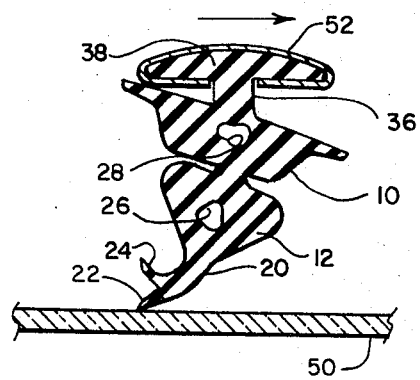
FIG. 3 is a cross-sectional view of a flexible, resilient windshield wiper blade secured in another type of holder and illustrating the action of the wiping on a glass surface in a direction opposite to that of FIG. 2.
Figure 4:
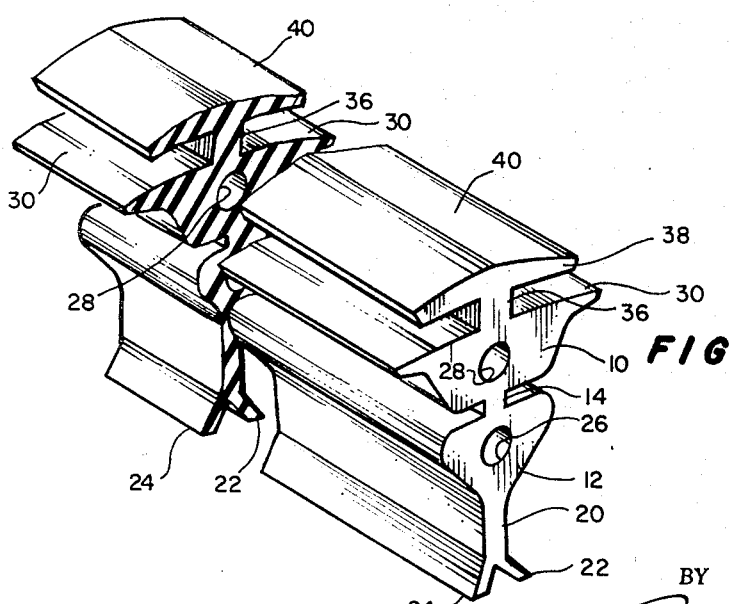
FIG. 4 is a perspective view, partially in section, of a windshield wiper blade according to the invention.

The blade supporting metal, which attaches to the yoke of the windshield wiper assembly, provides a fairly rigid support which does not tilt to any great extent and the material of the flexible, resilient portion of the blade must provide most of the tilting to present the edge of the bifurcated wiping end of the blade in proper position on the glass.

Where the friction between the blade and the glass exceeds a certain point the flange 36 bends and the top 30 of the body 10, impinges on the supporting metal. As shown in FIG. 3, the body 10 is tilted so that the top is against a metal sheath 52 covering the T-shaped flange 38. Such metal sheaths are another customary blade support, and may have a foraminous top. These sheaths attach to the yoke of a wiper assembly in conventional manner. When the friction is sufficient to cause the top to tilt, additional springiness is added to the blade for recovery from distortion.

The longitudinal passages, also, provide means for holding heating wires for a heated windshield wiper blade in accordance with my copending application Ser. No. 604,926, filed Dec. 27, 1966, entitled, Electrically Heated Windshield Wiper Assembly.

The blade of the invention has been extensively tested and has shown excellent results. It is not subject to the fast deterioration which is common with the natural rubber blades now used almost exclusively throughout the world. It retains its flexibility under a substantial range of temperature.

While the invention has been illustrated by reference to a particular embodiment, there is no intent to limit the spirit or scope of the invention to the precise details so set forth, except as defined in the appended claims.

I claim:

1. A flexible, resilient windshield wiper blade for a wiper assembly comprising an elongated, body of flexible, resilient material, said body having a first major portion of a general trapezoidal cross-section having a passage extending longitudinally therethrough and a second major portion of a general pear-shape having a passage extending longitudinally therethrough, and said first and second portions being connected by a thin web of material extending longitudinally therebetween from the middle of the large end of said pear-shaped portion to the middle of said trapezodal portion arranged to provide relative movement therebetween; the end of said pear-shaped portion terminating in a bifurcated end, with the two edges thereof spaced closely together so as to each wipe in only one direction; a lateral flange extending outwardly from said trapezoidal portion on the side opposite said web and extending along the length thereof; and a T-shaped flange extended from said trapezoidal portion on the side opposite said web forming a holding web for temporarily securing said blade to a wiper assembly.

2. A windshield wiper blade according to claim 1 wherein said body is extruded neoprene.

3. A windshield wiper blade according to claim 1 wherein said passages in said first and second portions are aligned generally centrally of said portions.

4. A windshield wiper blade according to claim 1 wherein the central portion of said T-shaped flange permits relative movement of said trapezoidal portion.

5. A windshield wiper blade according to claim 1 wherein a web extends between said pear-shaped portion and said bifurcated end arranged to flex and permit lateral displacement of said bifurcated end from said pear-shaped portion.

6. A windshield wiper blade according to claim 1 wherein said lateral flange depends outwardly from the edges of said trapezoidal portion.

References Cited

UNITED STATES PATENTS

| 1,699,634 | 1/1929 | Smulski | 15—250.41 |
| 2,011,015 | 8/1935 | Schleicher | 15—250.4 |
| 2,589,339 | 3/1952 | Carson | 15—250.4 |

PETER FELDMAN, *Primary Examiner.*

U.S. Cl. X.R.

15—250.41